United States Patent

Lorenz et al.

[11] 3,911,055
[45] Oct. 7, 1975

[54] O-ALKYL-O-(1-CYANO-1-TERT.-BUTYLKETONOXIME)-THIONOPHOSPHORIC (PHOSPHONIC) ACID ESTERS

[75] Inventors: Walter Lorenz, Wuppertal; Manfred Jautelat, Burscheid-Hilgen; Wolfgang Behrenz; Ingeborg Hammann, both of Cologne; Wilhelm Stendel, Wuppertal, all of Germany

[73] Assignee: Bayer Aktiengesellschaft, Leverkusen, Germany

[22] Filed: Sept. 4, 1973

[21] Appl. No.: 394,027

[30] Foreign Application Priority Data
Sept. 2, 1972 Germany............................ 2243370

[52] U.S. Cl................................. 260/940; 424/210
[51] Int. Cl.......... A01n 9/36; C07f 9/16; C07f 9/40
[58] Field of Search .................................... 260/940

[56] References Cited
OTHER PUBLICATIONS
Fine Chemicals Patents Journal, Vol. 7, No. 21, German 5:2 (5-31-67).

Primary Examiner—Lorraine A. Weinberger
Assistant Examiner—Richard L. Raymond
Attorney, Agent, or Firm—Burgess, Dinklage & Sprung

[57] ABSTRACT

O-Alkyl-O-(1-cyano-1-tert.-butylketonoxime)-thionophosphoric (phosphonic) acid esters of the formula

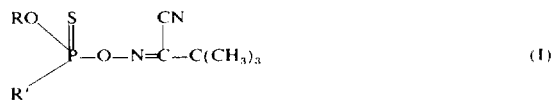

in which
R is lower alkyl radical, and
R' is lower alkyl or alkoxy, which possess insecticidal properties.

5 Claims, No Drawings

O-ALKYL-O-(1-CYANO-1-TERT.-BUTYLKETONOXIME)-THIONOPHOSPHORIC (PHOSPHONIC) ACID ESTERS

The present invention relates to and has for its objects the provision of particular new O-alkyl-O-(1-cyano-1-tert.-butylketonoxime)-thiono-phosphoric (phosphonic) acid esters, i.e. O-O-di-lower alkyl-O-(1-cyano-1-tert.-butylketonoxime)-thiono-phosphoric acid esters and O-alkyl-O-(1-cyano-1-tert.-butylketonoxime)-alkanethiono-phosphonic acid esters, which possess insecticidal properties, active compositions in the form of mixtures of such compounds with solid and liquid dispersible carrier vehicles, and methods for producing such compounds and for using such compounds in a new way especially for combating pests, e.g. insects, with other and further objects becoming apparent from a study of the within specification and accompanying examples.

It is known from German Published Specifications DAS 1,052,981 and 1,238,902 that thionophosphoric acid ester oximes, for example O,O-diethyl-(acetonoxime)- -diethyl-(acetonoxime)- (Compound A) and O,O-dimethyl-(1-cyano-1-phenyl-ketonoxime)-thionophosphoric acid esters (Compound B), possess insecticidal and acaricidal properties.

The present invention provides, as new compounds, the thionophosphoric(phosphonic) acid oxime derivatives of the general formula

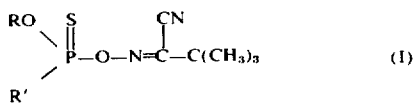

in which
R is lower alkyl radical, and
R' is lower alkyl or alkoxy.

It has been found that these compounds possess strong insecticidal properties.

Preferably the alkyl moieties of R and R' are straight-chain or branched with 1 to 4, especially 1 to 3, carbon atoms.

Surprisingly, the thionophosphoric(phosphonic) acid oxime derivatives according to the invention are distinguished, relative to prior-art compounds of analogous structure and of the same type of action, by a better insecticidal activity. The new compounds can not only be employed against insects which damage plants, but also against pests harmful to health and pests of stored products and/or, in the veterinary medicine field, against animal parasites (ectoparasites), such as parasitic fly larvae. The compounds according to the invention thus represent a genuine enrichment of the art.

Furthermore, the new compounds contribute to meeting the constant demand for new active compounds in the field of pesticides. This demand arises from the fact that the commercially available agents must meet constantly higher standards — particularly in respect of questions of protection of the environment — such as low toxicity to warm-blooded animals, low phytotoxicity, rapid degradation in and on the plant with short intervals between application of the pesticide and harvesting, and activity against resistant pests. Thus, inter alia, in the veterinary medicine field blowfly larvae have, over the course of the years, become resistant, in various areas, against the phosphoric acid ester derivatives and carbamates hitherto employed as agents for combating them, so that in many cases the success in combating is dubious. To ensure economical animal raising in the areas concerned where attack occurs, there is therefore a need for agents by means of which, for example, blowfly larvae including those of resistant strains, such as of the genus Lucilia, can be destroyed reliably. For example, the Goondiwindi strain of *Lucilia cuprina* has become highly resistant against the phosphoric acid ester derivatives and carbamates hitherto used. However, the active compounds according to the invention act against both the normally sensitive and the resistant strains of blowfly larvae. This special example merely serves to illustrate the resistance problems and does not imply a limitation, since these problems have of course equally existed generally, for years, in the fields of plant protection, hygiene and protection of stored products.

The present invention also provides a process for the preparation of a thionophosphoric(phosphonic) acid oxime derivative of the formula (I) in which 1-cyano-1-tert.-butylketonoxime of the formula

is reacted, in the form of an alkali metal salt, alkaline earth metal salt or ammonium salt thereof or in the presence of an acid-binding agent, with a thionophosphoric(phosphonic) acid ester halide of the general formula

in which
R and R' have the above-mentioned meanings, and
Hal is halogen, preferably chlorine.

If, for example, O,O-dimethylthionophosphoric acid ester chloride and 1-cyano-1-tert.-butylketonoxime are used as starting materials, the course of the reaction can be represented by the following equation:

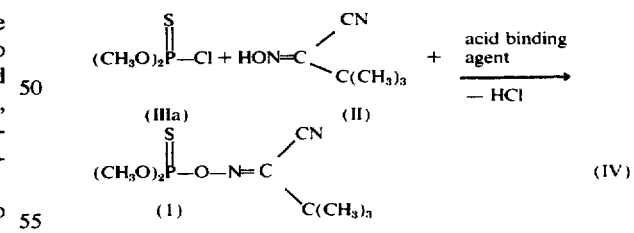

The following may be mentioned as examples of thionophosphoric(phosphonic) acid ester halides (III) that can be employed according to the process: O,O-dimethyl-, O,O-diethyl, O,O-di-n-propyl-, O,O-di-isopropyl-, O-methyl-O-ethyl- and O-ethyl-O-isopropyl-thionophosphoric acid ester chlorides, and O-methyl-, O-ethyl-, O-n-propyl- and O-isopropyl-methane-(or ethane-, n-propane- or isopropane-) thionophosphonic acid ester chlorides.

The thionophosphoric(phosphonic) acid ester halides (III) are known and can be prepared according to customary methods. 1-Cyano-1-tert.-butylketonoxime (II), which has not hitherto been described in the literature, can be obtained in a manner known in itself from the corresponding trimethylacetic acid anilide by reaction with thionyl chloride, to give the imide-chloride, and further reaction with copper cyanide to give the corresponding α-iminonitrile derivative, which is then converted into the oxime.

The process for the preparation of the new thionophosphoric(phosphonic) acid oxime derivatives (I) is preferably carried out with conjoint use of a suitable solvent or diluent. Practically all inert organic solvents can be used for this purpose, especially aliphatic and aromatic, optionally chlorinated hydrocarbons, such as benzene, toluene, xylenes, benzine, methylene chloride, chloroform, carbon tetrachloride, chlorobenzene; ethers, for example diethyl ether, dibutyl ether and dioxane; ketones such as acetone, methyl ethyl ketone, methyl isopropyl ketone and methyl isobutyl ketone; and nitriles, such as acetonitrile and propionitrile.

All customary acid-acceptors can be used as acid-binding agents. Alkali metal carbonates and alkali metal alcoholates, such as sodium carbonate and potassium carbonate, sodium methylate and ethylate and potassium methylate and ethylate have proved particularly suitable, as have aliphatic, aromatic or heterocyclic amines, for example triethylamine and dimethylamine, dimethylaniline, dimethylbenzylamine and pyridine.

The reaction temperature can be varied over a fairly wide range. In general, the reaction is carried out at from 10° to 100°C, preferably at from 20° to 50°C.

The reaction is generally carried out under normal pressure.

To carry out the process, the oxime is in most cases employed in a 10 to 20 percent molar excess. The reaction is in general carried out in a suitable solvent in the presence of an acid-acceptor and thereafter the reaction mixture is stirred for one to several hours and subsequently poured into water. The oil which separates out is taken up in an organic solvent, for example benzene, and the batch is worked up according to customary methods.

The new compounds are obtained in the form of oils, some of which cannot be distilled without decomposition but can be freed of the last volatile constituents by so-called "slight distillation", that is to say prolonged heating under reduced pressure to moderately elevated temperatures, and can be purified in this way. They are characterized by the refractive index.

As already mentioned, the thionophosphoric(phosphonic) acid oxime derivatives according to the invention are distinguished by an outstanding insecticidal activity against plant pests, pests harmful to health and pests of stored products, and, in the veterinary medicine field, against animal parasites (ectoparasites), such as parasitic fly larvae. They couple low phytotoxicity with a good action against both sucking and biting insects.

For these reasons, the compounds according to the invention can be employed successfully as pesticides in plant protection, and also in the hygiene field, the field of protection of stored products and the veterinary field.

To the sucking insects there belong, in the main, aphids (*Aphididae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidium*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assissin bug (*Rhodnius prolixus*) and Chagas' bug (*Triatoma infestans*) and, further cicadas, such as *Euscelis bilobatus* and *Nephotettix bipunctatus*.

In the case of the biting insects, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*), further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma fugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (*Coleoptera*), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes* spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as Henschoutedenia flexivitta; further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

When applied against pests harmful to health and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, or acaricides, rodenticides, fungicides, bactericides, nematocides, herbicides, fertilizers, growth-regulating agents etc., if desired, or in the form of particular dosage preparations for specific application made therefrom, such as solutions, emulsions, suspensions, powders pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g. insects, which comprises applying to at least one of correspondingly (a) such insects, and (b) the corresponding habitat thereof, i.e. the locus to be protected, a correspondingly combative or toxic amount, i.e. an insecticidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

A mixture of 53 g (0.42 mole) of 1-cyano-1-tert.-butylketonoxime, 200 ml of acetonitrile and 63 g (0.46 mole) of potassium carbonate was stirred for half an hour at 50°C. 56 g (0.35 mole) of O,O-dimethylthionophosphoric acid ester chloride were then added while cooling externally, thereby keeping the temperature of the mixture at 25°C. The batch was then stirred for a further hour. Water was added and the oil which separated out was taken up in benzene and washed twice with 2 N sodium hydroxide solution. After washing until a neutral reaction was obtained, the benzene solution was dried and the solvent was distilled off. 80 g (91.5 percent of theory) of O,O-dimethyl-O-(1-cyano-1-tert.-butylketonoxime)-thionophosphoric acid ester (compound (1) in the biological Examples) were obtained in the form of a yellow oil with a refractive index $n_D^{21}$ of 1.4746.

The compounds of the following structure were prepared by methods analogous to that described above:

Table 1

| Compound No. | Formula | Physical properties (refractive index) | Yield (% of theory) |
|---|---|---|---|
| (2) | $\begin{array}{c}C_2H_5O\\ \diagdown\\ \diagup\\ C_2H_5\end{array}\overset{S}{\underset{\|}{P}}-O-N=\overset{CN}{\underset{\|}{C}}-C(CH_3)_3$ | $n_D^{21} = 1.4812$ | 95.5 |
| (3) | $(C_2H_5O)_2\overset{S}{\underset{\|}{P}}-O-N=\overset{CN}{\underset{\|}{C}}-C(CH_3)_3$ | $n_D^{21} = 1.4732$ | 95.0 |

Other compounds which may similarly be prepared include:

O-isopropyl-O-(1-cyano-1-tert.-butylketonoxime)-n-butanethiono-phosphonic acid ester,
O,O-diisobutyl-O-(1-cyano-1-tert.-butylketonoxime)-thionophosphoric acid ester, and the like.

In the biological Examples 2 to 8 which follow, certain compounds according to the invention (which are identified by the numbers assigned to them in the preparative Example) are compared with known compounds of analogous structure and identical type of action with regard to insecticidal activity.

The known comparison compounds (A) and (B) have the formulas:

(A) 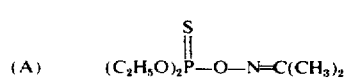

(B) 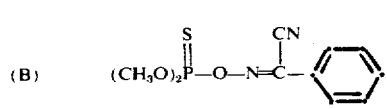

EXAMPLE 2

Drosophila test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier, and the concentrate was diluted with water to the desired concentration.

1 ml of the preparation of the active compound was applied with a pipette to a filter paper disc of 7 cm diameter. The wet disc was placed in a glass vessel containing 50 vinegar flies (*Drosophila melanogaster*) and covered with a glass plate.

After the specified periods of time, the destruction was determined as a percentage: 100 percent means that all the flies were killed; 0 percent means that none of the flies were killed.

The active compounds, their concentrations, the evaluation times and the degree of destruction can be seen from the following Table 2:

Table 2

| Active compound | (*Drosophila* test) Active compound concentration in % | Degree of destruction in % after 1 day |
|---|---|---|
| (A) | 0.1 | 100 |
|  | 0.01 | 0 |
| (B) | 0.1 | 100 |
|  | 0.01 | 100 |
|  | 0.001 | 100 |
|  | 0.0001 | 20 |
| (1) | 0.1 | 100 |
|  | 0.01 | 100 |
|  | 0.001 | 100 |
|  | 0.0001 | 100 |
|  | 0.00001 | 100 |
|  | 0.000001 | 100 |
| (2) | 0.1 | 100 |
|  | 0.01 | 100 |
|  | 0.001 | 100 |
|  | 0.0001 | 100 |
|  | 0.00001 | 100 |
|  | 0.000001 | 100 |
| (3) | 0.1 | 100 |
|  | 0.01 | 100 |
|  | 0.001 | 100 |
|  | 0.0001 | 100 |

EXAMPLE 3

Phaedon larvae test

Solvent: 3 parts by weight of acetone

Emulsifier: 1 part by weight of alkylaryl polyglycol ether

To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dripping wet and were infested with mustard beetle larvae (*Phaedon cochleariae*).

After the stated times, the degree of destruction in percent was determined. 100 percent means that all beetle larvae were killed and 0 percent means that no beetle larvae were killed.

The active compounds, active compound concentrations, evaluation times and results can be seen from Table 3 which follows:

Table 3

| Active compound | (*Phaedon* larvae test) Active compound concentration in % | Degree of destruction in % after 3 days |
|---|---|---|
| (A) | 0.1 | 0 |
| (1) | 0.1 | 100 |
| (2) | 0.1 | 100 |
|  | 0.01 | 100 |
| (3) | 0.1 | 100 |

EXAMPLE 4

Plutella test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage: 100 percent means that all the caterpillars were killed whereas 0 percent means that none of the caterpillars were killed.

The active compounds, the concentrations of the active compounds, the evaluation times and the results can be seen from the following Table 4:

Table 4

| Active compound | (*Plutella* test) Active compound concentration in % | Degree of destruction in % after 3 days |
|---|---|---|
| (A) | 0.1 | 40 |
|  | 0.01 | 0 |
| (1) | 0.1 | 100 |
|  | 0.01 | 70 |
| (2) | 0.1 | 100 |
|  | 0.01 | 100 |
|  | 0.001 | 100 |

Table 4-Continued

| Active compound | (*Plutella* test) Active compound concentration in % | Degree of destruction in % after 3 days |
|---|---|---|
| (3) | 0.1 | 100 |
|  | 0.01 | 50 |

EXAMPLE 5

$LT_{100}$ test for Diptera
Test insects: *Musca domestica*
Solvent: Acetone 2 parts by weight of active compound were dissolved in 1000 parts by volume of solvent. The solution so obtained was diluted with further solvent to the desired lower concentrations.

2.5 ml of the solution of active compound were pipetted into a Petri dish. On the bottom of the Petri dish there was a filter paper with a diameter of about 9.5 cm. The Petri dish remained uncovered until the solvent had completely evaporated. The amount of active compound per $m^2$ of filter paper varied with the concentration of the solution of active compound used. About 25 test insects were then placed in the Petri dish and it was covered with a glass lid.

The condition of the test insects was continuously observed. The time which was necessary for 100 percent destruction was determined.

The test insects, the active compounds, the concentrations of the active compounds and the times at which there was 100 percent destruction can be seen from the following Table 5:

Table 5

| Active compound | ($LT_{100}$ test for *Diptesa/Musca domestica*) Active compound concentration of the solution in % | $LT_{100}$ |
|---|---|---|
| (A) | 0.2 | 180' |
|  | 0.04 | 6 hrs = 40% |
| (1) | 0.2 | 45' |
|  | 0.04 | 60' |
|  | 0.008 | 120' |
|  | 0.0016 | 180' |
|  | 0.00032 | 6 hrs = 50% |
| (2) | 0.2 | 30' |
|  | 0.04 | 60' |
|  | 0.008 | 75' |
|  | 0.0016 | 180' |
|  | 0.00032 | 6 hrs = 70% |
| (3) | 0.2 | 45' |
|  | 0.04 | 60' |
|  | 0.008 | 90' |
|  | 0.0016 | 180' |
|  | 0.00032 | 6 hrs = 80% |

EXAMPLE 6

Test insects: *Blattella germanica*
Solvent: Acetone 2 parts by weight of the active compound were dissolved in 1,000 parts by volume of the solvent. The solution so obtained was diluted with further solvent to the desired concentrations.

2.5 ml of the solution of the active compound were pipetted into a Petri dish. On the bottom of the Petri dish there was a filter paper with a diameter of about 9.5 cm. The Petri dish remained uncovered until the solvent had completely evaporated. The amount of active compound per $m^2$ of filter paper varied with the concentration of the solution of active compound. About 25 test insects were then placed in the Petri dish and it was covered with a glass lid.

The condition of the test insects was observed 3 days after the commencement of the experiments. The destruction, in percent, was determined.

The active compounds, the concentrations of the active compounds, the test insects and the results can be seen from the following Table 6:

Table 6

| Active compound | (Blattella germanica) Active compound concentration of the solution in % | Degree of destruction in % after 3 days |
|---|---|---|
| (A) | 0.2 | 100 |
|  | 0.04 | 0 |
| (1) | 0.2 | 100 |
|  | 0.04 | 100 |
|  | 0.008 | 100 |
|  | 0.0016 | 20 |
| (2) | 0.2 | 100 |
|  | 0.04 | 100 |
|  | 0.008 | 100 |
|  | 0.0016 | 20 |
| (3) | 0.2 | 100 |
|  | 0.04 | 100 |
|  | 0.008 | 80 |

EXAMPLE 7

Test insects: *Dermestes peruvianus*
Solvent: Acetone 2 parts by weight of the active compound were dissolved in 1,000 parts by volume of the solvent. The solution so obtained was diluted with further solvent to the desired concentrations.

2.5 ml of the solution of the active compound were pipetted into a Petri dish. On the bottom of the Petri dish there was a filter paper with a diameter of about 9.5 cm. The Petri dish remained uncovered until the solvent had completely evaporated. The amount of active compound per $m^2$ of filter paper varied with the concentration of the solution of active compound. About 25 test insects were then placed in the Petri dish and it was covered with a glass lid.

The condition of the test insects was observed 3 days after the commencement of the experiments. The destruction, in percent, was determined.

The active compounds, the concentrations of the active compounds, the test insects and the results can be seen from the following Table 7:

Table 7

| Active compound | (Dermestes peruvianus) Active compound concentration of the solution in % | Degree of destruction in % after 3 days |
|---|---|---|
| (A) | 0.2 | 100 |
|  | 0.04 | 0 |
| (1) | 0.2 | 100 |
|  | 0.04 | 100 |

Table 7-Continued

| Active compound | (Dermestes peruvianus) Active compound concentration of the solution in % | Degree of destruction in % after 3 days |
|---|---|---|
|  | 0.008 | 100 |
|  | 0.0016 | 20 |
| (2) | 0.2 | 100 |
|  | 0.04 | 100 |
|  | 0.008 | 100 |
|  | 0.0016 | 0 |
| (3) | 0.2 | 100 |
|  | 0.04 | 100 |
|  | 0.008 | 80 |

EXAMPLE 8

Test with parasitic fly larvae
Emulsifier: Highly oxyethylated castor oil

To produce a suitable preparation of active compound 1 part by weight of the active substance in question was mixed with 2 parts by weight of the above emulsifier and mixture thus obtained was diluted with water to the desired concentration.

About 20 fly larvae (*Lucilia cuprina*) were introduced into a test tube which contained a cottonwool plug (diameter 1.7 cm; height 1 cm) which had beforehand been moistened with 2.5 ml of a 25 percent strength suspension of bonemeal in water. Thereafter, 0.5 ml of the active compound preparation to be tested was introduced. After 24 hours, the degree of destruction in percent was determined. 100 percent means that all larvae were killed and 0 percent means that no larvae were killed.

The test results obtained are summarized in Table 8:

Table 8

| Active compound | (Test with parasitic fly larvae/Lucilia cuprina) Active compound concentration in ppm | Degree of destruction in % after 1 day |
|---|---|---|
| (A) | 100 | 100 |
|  | 30 | 100 |
|  | 10 | 100 |
|  | 3 | 100 |
|  | 1 | 100 |
|  | 0.3 | 0 |
| (2) | 100 | 100 |
|  | 10 | 100 |
|  | 1 | 100 |
|  | 0.1 | 0 |
| (3) | 100 | 100 |
|  | 30 | 100 |
|  | 10 | 100 |
|  | 3 | 100 |
|  | 1 | 100 |
|  | 0.3 | 100 |
|  | 0.1 | 0 |

It will be appreciated that the instant specification and examples are set forth by way of illustration and not limitation, and that various modifications and changes may be made without departing from the spirit and scope of the present invention.

What is claimed is:

1. An O-alkyl-O-(1-cyano-1-tert.-butylketonoxime)-thionophosphoric or phosphonic acid ester of the formula

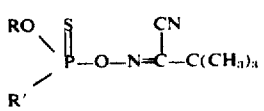

in which
R is lower alkyl, and
R' is lower alkyl or alkoxy.

2. A compound according to claim 1, in which R is alkyl of 1 to 3 carbon atoms and R' is alkyl or alkoxy of 1 to 3 carbon atoms.

3. The compound according to claim 1, wherein such compound is O,O-dimethyl-O-(1-cyano-1-tert.-butylketonoxime)-thionophosphoric acid ester of the formula

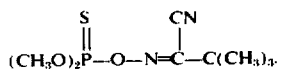

4. The compound according to claim 1, wherein such compound is O-ethyl-O-(1-cyano-1-tert.-butylketonoxime)-ethane-thionophosphonic acid ester of the formula

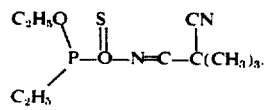

5. The compound according to claim 1, wherein such compound is O,O-diethyl-O-(1-cyano-1-tert.-butylketonoxime)-thionophosphoric acid ester of the formula

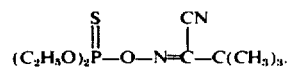

* * * * *